(12) United States Patent
Saka (10) Patent No.: US 7,105,804 B2
(45) Date of Patent: Sep. 12, 2006

(54) LIGHT BEAM SCANNING UNIT AND IMAGE FORMING APPARATUS

(75) Inventor: Masaki Saka, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 14 days.

(21) Appl. No.: 11/070,151

(22) Filed: Mar. 3, 2005

(65) Prior Publication Data

US 2005/0194525 A1  Sep. 8, 2005

(30) Foreign Application Priority Data

Mar. 5, 2004  (JP) ............................. 2004-062441

(51) Int. Cl.
*H01J 3/14* (2006.01)
*G03G 21/20* (2006.01)

(52) U.S. Cl. ...................... 250/234; 250/236; 250/238; 399/44; 399/94; 347/17

(58) Field of Classification Search ........ 250/234–236, 250/238; 399/44, 69, 94; 347/17
See application file for complete search history.

(56) References Cited

U.S. PATENT DOCUMENTS

2004/0212861 A1* 10/2004 Gagne et al. ............... 359/196

FOREIGN PATENT DOCUMENTS

| JP | S63-137206 A | 6/1988 |
| JP | H10-206776 A | 8/1998 |
| JP | H11-052276 A | 2/1999 |
| JP | H11-184356 A | 7/1999 |

* cited by examiner

*Primary Examiner*—Kevin Pyo
(74) *Attorney, Agent, or Firm*—Birch, Stewart, Kolasch & Birch, LLP (57) ABSTRACT

The temperature difference between an internal temperature and an external temperature which are detected by an internal temperature sensor and an external temperature sensor, respectively, is calculated. If the internal temperature is lower by not less than predetermined degrees than the external temperature and, hence, condensation on the surface of each optical component within a laser writing unit is highly likely, a motor is driven to rotate a polygonal mirror. During its operation the motor generates heat, which in turn transfers from a flange portion directly to a housing while heating air around the laser writing unit. Further, air within the housing is stirred by rotation of the polygonal mirror. In this way the temperature of the entire laser writing unit is raised.

11 Claims, 6 Drawing Sheets

LIGHT BEAM SCANNING UNIT AND IMAGE FORMING APPARATUS

CROSS REFERENCE

This Nonprovisional application claims priority under 35 U.S.C. § 119(a) on Patent Application No. 2004-062441 filed in Japan on Mar. 5, 2004, the entire contents of which are hereby incorporated by reference.

BACKGROUND OF THE INVENTION

The present invention relates to a light beam scanning unit for scanning an object with a light beam emitted from a light source in a predetermined direction through optical components including a deflecting member and a lens. This invention also relates to an image forming apparatus configured to perform electrographic image formation by irradiating an image carrier with a light beam emanated from a light beam scanning unit and modulated in accordance with image data.

In an image forming apparatus for electrophotographic image formation such as a copier or a printer, the surface of an image carrier electrostatically charged beforehand by static charger means is exposed to and scanned with a light image modulated in accordance with image data to form an electrostatic latent image thereon. The electrostatic latent image on the surface of the image carrier is turned into a visible toner image by development means and then transferred to a recording sheet. Finally, the toner image thus transferred is fixed to the recording sheet by fixing means.

Such an image forming apparatus has a light beam scanning unit as means of irradiating the surface of the image carrier with a light image. In general, frequent use is made of light beam scanning units of the laser beam type having a semiconductor laser for emitting laser light modulated in accordance with image data because such laser beam type light beam scanning units are suitable for increased modulation speed and scanning speed.

Such a light beam scanning unit has a housing accommodating therein a light source such as a semiconductor laser, as well as optical components including a collimator lens, polygonal mirror, fθ lens and reflecting mirror. The light beam scanning unit emanates a light beam from an emanation window having a glass plate to scan an object such as an image carrier. A problem with such a light beam scanning unit is that optical characteristics of the optical components are degraded because of condensation on the optical components including the emanation window which is likely when the temperature difference between the interior and the exterior of the housing becomes large. Specifically, as the ambient temperature rises rapidly after the light beam scanning unit has been allowed to stand at a low ambient temperature for a long time, outside air flowing into the housing of the light beam scanning unit contacts the surface of each optical component still remaining in a low-temperature state and is thereby cooled rapidly, with the result that the moisture contained in air condenses on the surface of the optical component.

In attempt to overcome this problem, one conventional light beam scanning unit is provided with a condensation preventing heater operative to prevent the temperature within the housing from becoming lower than the ambient temperature, as disclosed in Japanese Patent Application Laid-Open No. S63-137206.

Recently, however, the material of such a housing as a base component of the light beam scanning unit has been changed from diecast metal having a low suitability for volume production to a molded resin having a superior suitability for volume production in order to reduce the cost. Accordingly, the heat resistance of the housing becomes relatively low. For this reason it is impossible to mount the aforementioned condensation preventing heater directly on the housing. The housing is imparted with the function of fixing the aforementioned optical components to respective predetermined positions with high precision so as to obtain desired optical characteristics as well as the function of protecting the optical components so as to keep the obtained optical characteristics over a long term. If the heater adapted to generate heat to a high temperature is mounted for preventing condensation directly on the housing comprising a molded resin product having a low heat resistance, the housing will be deformed to cause deviation of the optical axis of a laser beam, incorrect focusing, degradation in fθ characteristic, and the like, thus resulting in a problem that desired optical characteristics cannot be ensured.

Further, a heater dedicated to heat the optical components has to be disposed at an optimal position within the housing, which leads to increase in the size of the housing and in the cost.

A feature of the present invention is to provide a light beam scanning unit which is capable of preventing condensation on the optical components without provision of a dedicated heater on the housing, preventing degradation in image quality due to deformation of the housing, and avoiding the increase in the size of the housing and in the cost. Another feature of the present invention is to provide an image forming apparatus provided with such a light beam scanning unit.

SUMMARY OF THE INVENTION

According to the present invention, there is provided a light beam scanning unit comprising: a light source configured to emit a light beam; a deflecting member configured to deflect the light beam in a predetermined scanning direction by rotation caused by a driving force of a motor; optical components including a lens configured to focus the light beam on an object to form an image on the object; a housing accommodating the light source, deflecting member and the optical components therein; and a driving control circuit configured to carry out a condensation preventing process by causing the deflecting member to rotate when detection is made of a condition where a temperature outside the housing is higher than a temperature inside the housing.

The foregoing and other features and attendant advantages of the present invention will become more apparent from the reading of the following detailed description of the invention in conjunction with the accompanying drawings.

DETAILED DESCRIPTION OF THE INVENTION

The present invention will now be described in detail with reference to the accompanying drawings.

Figure 1:
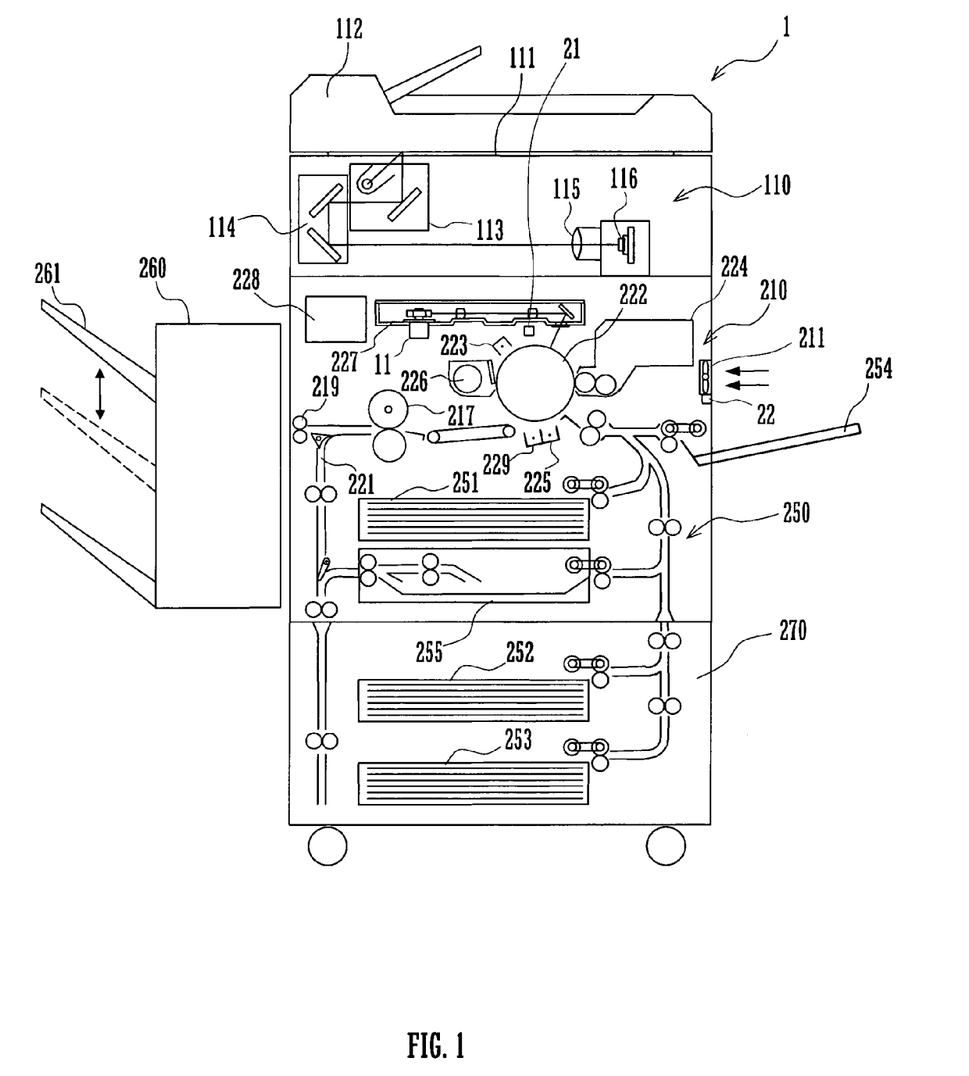
FIG. 1 is a schematic view showing the construction of an image forming apparatus provided with a light beam scanning unit embodying the present invention.

Referring first to FIG. 1, an image forming apparatus 1 includes a document reading section 110, an image forming section 210, and a sheet feed section 250 and is placed on a sheet feed unit 270 and fitted with a post-processing unit 260 on one side thereof.

Over a platen 111 comprising transparent glass on top of the image forming apparatus 1 is mounted an automatic document feeder 112 configured to automatically feed plural sheets of document onto the platen 111 one by one.

The document reading section 110 located under the platen 111 reads the image of a document placed on the platen 111 by scanning. The document reading section 110 includes a first scanning unit 113, a second scanning unit 114, an optical lens 115, and a photoelectric converter (hereinafter will be referred to as CCD line sensor) 116. The first scanning unit 113 includes an exposure lamp unit for exposing an image bearing side of the document to light, and a first mirror for reflecting a light image reflected from the document in a predetermined direction. The second scanning unit 114 includes second and third mirrors for guiding the light image reflected by the first mirror to the CCD line sensor 116. The optical lens 115 focuses light reflected from the image bearing side of the document on the CCD line sensor 116 to form the image of the document thereon. In association with the operation of the automatic document feeder 112, the document reading section 110 sequentially reads the images of document sheets fed by the automatic document feeder 112 onto the platen 111 one by one.

Figure 2:
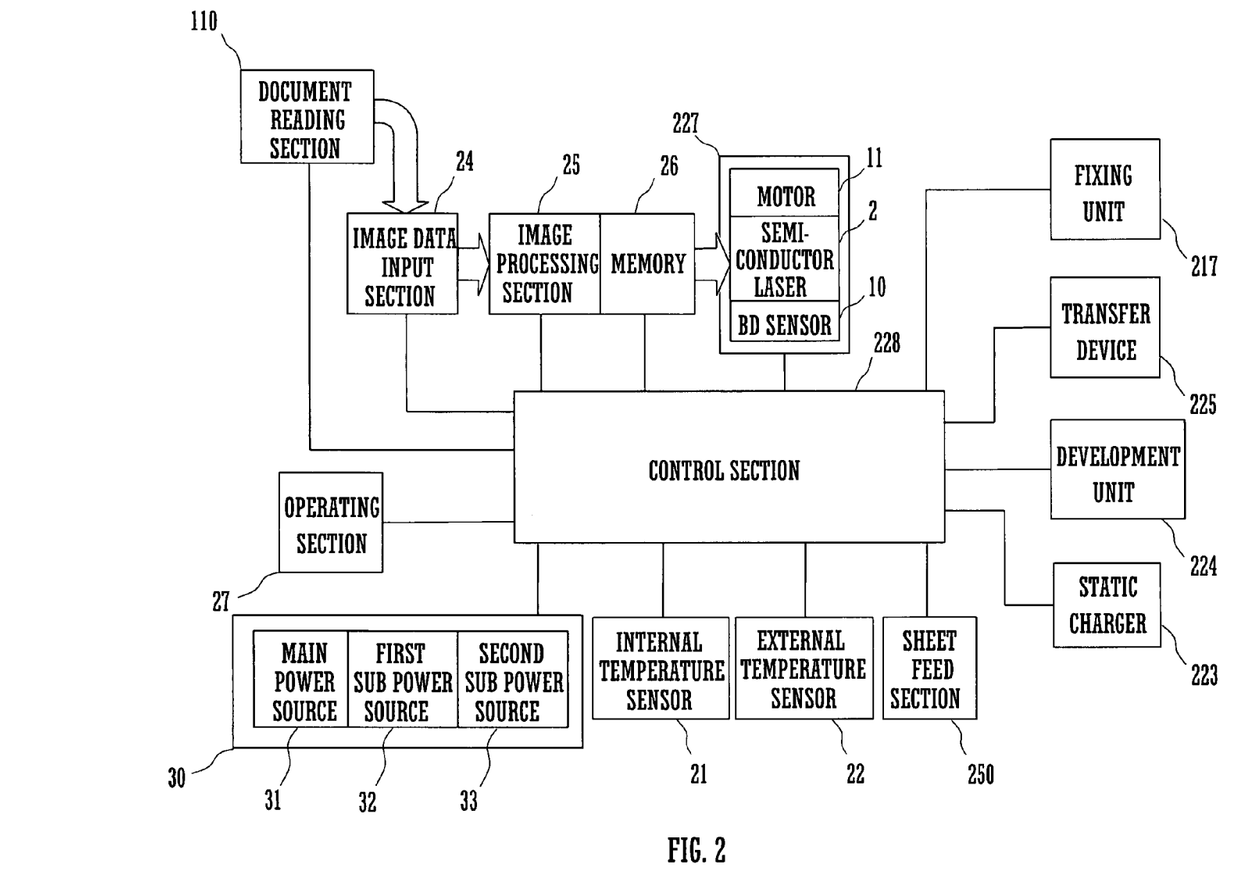
FIG. 2 is a block diagram of the image forming apparatus including a control section.

The document image read by the document reading section 110 is temporarily stored in a memory 26 through an image data input section 24 and an image processing section 25. The image data stored in a memory 26 is transferred to the image forming section 210 in response to an instruction to output.

The image forming section 210 has a rotatably supported photosensitive drum 222 as the image carrier (object) defined by the present invention. Around the photosensitive drum 222 are disposed a static charger 223, a development unit 224, a transfer device 225, a peeler 229, and a cleaning unit 226. The image forming section 210 further includes a laser writing unit 227 as the light beam scanning unit defined by the present invention, a fixing unit 217, and a control section 228.

The static charger 223 electrostaticaly charges the periphery of the photosensitive drum 222 to a predetermined potential uniformly. The laser writing unit 227 irradiates a peripheral surface of the photosensitive drum 222 having passed through the position where the photosensitive drum 222 faces the static charger 223 with laser light (the light beam defined by the present invention) modulated in accordance with image data transferred from the memory 26 of the image processing section 25 or image data transferred from an external device. The development unit 224 turns an electrostatic latent image formed on the periphery of the photosensitive drum 222 by irradiation with laser light into a visible toner image. The transfer device 225 transfers the toner image carried on the periphery of the photosensitive drum 222 to a recording medium such as a recording sheet. The peeler 229 eliminates static charge on the recording medium bearing the toner image transferred thereto to enhance the releasability of the recording medium from the periphery of the photosensitive drum 222. The cleaning unit 226 collects toner remaining on the periphery of the photosensitive drum 222 having finished with the transfer process.

The sheet feed section 250, which is located below the image forming section 210, includes a manual feed tray 254, a reversing unit 255 for both-side printing, and a sheet feed tray 251. The multi-tier sheet feed unit 270 located below the sheet feed section 250 includes sheet feed trays 252 and 253. The sheet feed section 250 feeds a recording medium held by any one of the trays 251 to 254 to the space between the photosensitive drum 210 and the transfer device 225 in the image forming section 210. The recording medium bearing the toner image transferred thereto is subjected to heat and pressure in the fixing unit 217 so that the toner image is fixed to the surface of the recording medium.

The sheet feed section 250 defines a switch-back feed path 221 branched from the feed path extending between the fixing unit 217 and a sheet ejecting roller 219. When required, the recording medium having passed through the fixing unit 217 is guided to the switch-back feed path 221 and then introduced into the reversing unit 255 in a state turned front side back. In forming images on the both sides of a recording medium, the reversing unit 255 guides the recording sheet formed with an image on a first side into the image forming section 210 again so that a second side of the recording medium faces the periphery of the photosensitive drum 222.

The sheet ejecting roller 219 ejects the recording medium having finished with image formation thereon to the exterior of the apparatus body. The recording medium ejected by the sheet ejecting roller 219 is held on an ejected sheet tray 261 of the post-processing unit 260 having a stapling function and other functions.

The reversing unit 255 is replaceable with an ordinary sheet feed tray.

The control section 228 controls all the sections and parts of the image forming apparatus 1. For this purpose, the control section 228 is connected to input-output devices of respective of the image forming section 110, the image data input section 24, the image processing section 25, the memory 26, an operating section 27, the laser writing unit 227, the fixing unit 217, the transfer device 225, the development unit 224, the static charger 223, the sheet feed section 250, an internal temperature sensor 21, an external temperature sensor 22, a determination circuit section 23, a power source section 30 and other sections and parts.

The operating section 27 is located on top of the image forming apparatus 1 and includes keys for receiving manual input operations by the operator and a display for displaying various operating states and the like. The control section 228 outputs driving data and the like to each of the input-output devices in accordance with a prestored program in response to an input operation through the operating section 27.

Signals outputted from the CCD line sensor 116 of the document reading section 110 are converted into digital image data at the image data input section 24 and then subjected to predetermined image processing by the image processing section 25, followed by storage into the memory 26. The control section 228 transfers the image data from the memory 26 to a semiconductor laser 2 of the laser writing unit 227 with predetermined timing. In the laser writing unit 227 a polygonal mirror 4 starts being rotated by a polygonal mirror motor 11 prior to the transfer of the image data. The control section 228 feeds the image data from the memory 26 to the semiconductor laser 2 line by line after lapse of a predetermined time period from the time of an input of a laser light receipt signal from a BD (Bean Detector) sensor 10.

The control section 228 controls the temperature of a fixing roller of the fixing unit 217 depending on the image forming processing condition. The temperature of the fixing roller is maintained at a predetermined temperature such as to allow toner to fuse during standby for the image forming process or during the image forming process. If the current mode turns into a power saving mode because of a continuous failure to perform the image processing operation for a predetermined time period, the temperature of the fixing roller is controlled to a temperature lower than the aforementioned predetermined temperature.

During the image forming process, the control section 228 drives each of the sheet feed section 250, the static charger 223, the development unit 224 and the transfer device 225 with respective required timing to cause the toner image formed on the periphery of the photosensitive drum 222 to be transferred to a recording medium fed from the sheet feed section 250.

The power source section 30 for supplying electric power to the control section 228 and the input-output devices includes a main power source 31 and first and second sub power sources 32 and 33. During a normal image forming process the control section 228 and the input-output devices are supplied with power from the main power source 31 of the power source section 30. In an idle mode for receiving entry of image data from only external devices, such as a facsimile apparatus, at nighttime or on a holiday, only the first sub power source 32 operates to supply power to a communications board of the control section 228, while the main power source 31, which is a high-voltage power source, fails to operate, whereby the power consumption can be reduced.

For example, where the commercial voltage is AC 100 V, the main power source 31 is an AC 100-V, 1.5-KW power source for supplying an AC 100-V voltage and plural DC voltages to the image forming section. The first sub power source 32 is a DC 12-V, 5-W power source for supplying power to the communications board (FAX board for example), while the second sub power source 33 is a DC 24-V, 48-W power source which can ensure a maximum current (2 A for example) in actuating the polygonal mirror motor 11 for driving the polygonal mirror 4.

The power source section 30 further includes a DC 5-V power source of several watts for temperature detection by the internal temperature sensor 21 and the external temperature sensor 22 and a DC 3.3-V power source of several watts for the control section 228 to carry out the condensation preventing process.

The control section 228 further includes the driving control circuit defined by the present invention for driving the polygonal mirror motor 11 based on temperatures detected by respective of the internal temperature sensor 21 and the external temperature sensor 22 during the condensation preventing process to be described later. The internal temperature sensor 21 and the external temperature sensor 22 are included in the detector defined by the present invention. In an exemplary arrangement the internal temperature sensor 21 is disposed adjacent the laser writing unit 227 and the external temperature sensor 22 disposed adjacent a fan 211 operative to take outside air into the image forming apparatus 1, as shown in FIG. 1.

Figure 3:
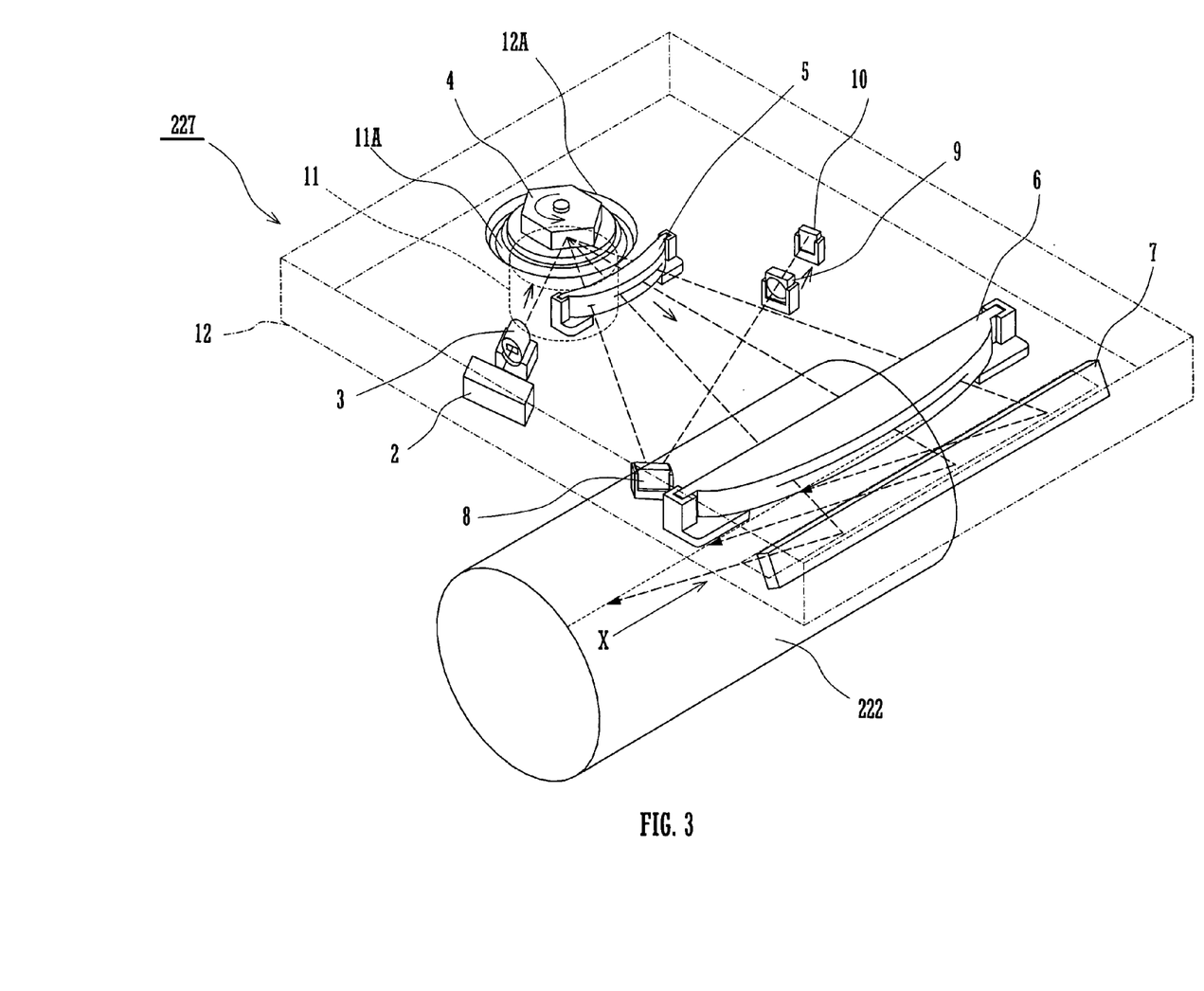
FIG. 3 is a perspective view showing the structure of a laser writing unit provided as the light beam scanning unit.

Referring to FIG. 3, the laser writing unit 227 has a housing 12 accommodating therein the semiconductor laser 2, a collimator lens 3, the polygonal mirror 4, fθ lenses 5 and 6, a return mirror 7, a BD sensor mirror 8, a BD sensor lens 9, and the BD sensor 10.

The semiconductor laser 2, which is the light source defined by the present invention, emits laser light (the light beam defined by the present invention) modulated in accordance with image data. The collimator lens 3, which is the lens defined by the present invention, has an aperture stop member and turns laser light emitted from the semiconductor laser 2 into parallel rays. The polygonal mirror 4 is rotated by the polygonal mirror motor 11 in the direction indicated by arrow to deflect laser light in a predetermined primary scanning direction at a uniform angular velocity.

The polygonal mirror motor 11, which is the motor defined by the present invention, has a main body located below the bottom of the housing 12 (see FIG. 1) and an upper flange portion 11A fitted in a perforated portion 12A of the housing 12 so as to be exposed within the housing 12. Accordingly, the polygonal mirror motor 11 is in contact with the housing 12 at the flange portion 11A at least.

The fθ lenses 5 and 6, which are included in the lens defined by the present invention, deflect laser light deflected at a uniform angular velocity by the polygonal mirror 4 along the axis of rotation of the photosensitive drum 222 (in the primary scanning direction) at a uniform rate. The return mirror 7 reflects laser light deflected at a uniform rate by the fθ lenses 5 and 6 toward the periphery of the photosensitive drum 222. Thus, the periphery of the photosensitive drum 222 is scanned in the direction indicated by arrow X with laser light modulated in accordance with image data.

The BD sensor mirror 8 reflects toward the BD sensor 10 rays of laser light that have been deflected by the polygonal mirror 4 toward such a direction as to pass within a range which fails to allow the laser light to become incident on the periphery of the photosensitive drum 222. Such laser light rays reflected by the BD sensor mirror 8 are focused on the light-receiving surface of the BD sensor by the BD sensor lens 9. The BD sensor 10 detects laser light deflected by the polygonal mirror 4 at a predetermined reference position in the primary scanning direction. The timing with which image data is to be written to the periphery of the photosensitive drum 222 line by line is determined based on a detection signal from the BD sensor 10.

The collimator lens 3, the polygonal mirror 4, the fθ lenses 5 and 6 and the return mirror 7 are included in the optical components defined by the present invention.

The housing 12 is a base member of the laser writing unit 227 for holding the aforementioned optical components as well as the polygonal mirror motor 11, semiconductor laser 2 and the like fixedly at their respective predetermined positions with high precision. For this reason, the housing 12 is formed from a material which has a sufficient strength and ensures highest possible dimensional stability to temperature. Usually, the housing 12 is molded of a resin such as PC (polycarbonate) containing about 40% to about 50% of glass or BMC (bulk molding compound), popularly called fiber-reinforced unsaturated polyester resin (FRP).

Figure 4:
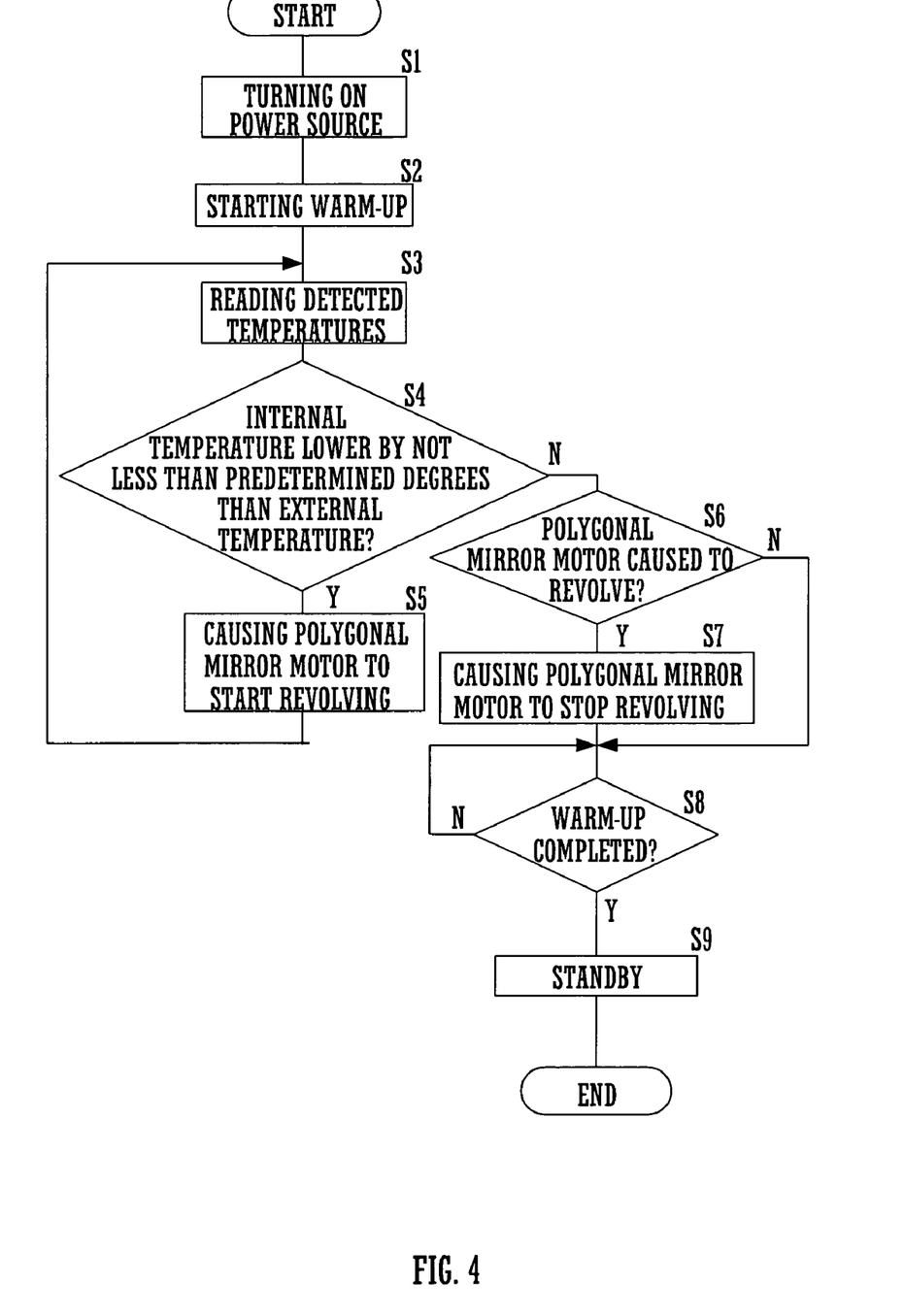
FIG. 4 is a flowchart of a processing procedure of a condensation preventing process followed by a driving control circuit included in the control section of the image forming apparatus.

Referring to FIG. 4, when the main power source 31 is turned on (step S1), the control section 228 starts warm-up to raise the temperature of the fixing roller of the fixing unit 217 to such a temperature as to allow toner to fuse (step S2). During the warm-up the control section 228 reads temperatures detected by respective of the internal temperature sensor 21 and the external temperature sensor 22 as internal and external conditions (step S3). Then, the control section 228 calculates the temperature difference between the detected internal temperature and the detected external temperature to determine whether or not the internal temperature is lower by not less than predetermined degrees than the external temperature (step S4).

If the internal temperature is determined as being lower by predetermined degrees than the external temperature and, hence, condensation on the surface of each optical component within the laser writing unit 227 is highly likely, the control section 228 actuates the polygonal mirror motor 11 to rotate the polygonal mirror 4 (step S5).

During its operation the polygonal mirror motor 11 generates heat, which in turn transfers from the flange portion 11A directly to the housing 12 while heating air around the laser writing unit 227. Further, air within the housing 12 is stirred by rotation of the polygonal mirror 4. In this way the temperature of the entire laser writing unit 227 is raised.

Thus, the laser writing unit 227 is wholly heated without provision of a dedicated heater, so that the surface temperature of each optical component rises at an early stage. Accordingly, condensation on the surface of each optical component due to contact with outside air flowing into the laser writing unit 227 will not occur.

The control section 228 repeats reading of detected temperatures even after actuation of the polygonal mirror motor 11 (step S5→step S3). When the internal temperature becomes sufficiently close to the external temperature, the control section 228 causes the polygonal mirror motor 11 to stop revolving (step S4→step S6→step S7). Upon completion of the warm-up, the control section 228 assumes a standby state for the image forming process (steps S8 and S9). If the internal temperature is sufficiently close to or higher than the external temperature from the time just after the starting of the warm-up, the control section 228 assumes the standby state for the image forming process upon completion of the warm-up without causing the polygonal mirror motor 11 to revolve for preventing condensation (step S4→step S6→step S8→step S9).

Figure 5:
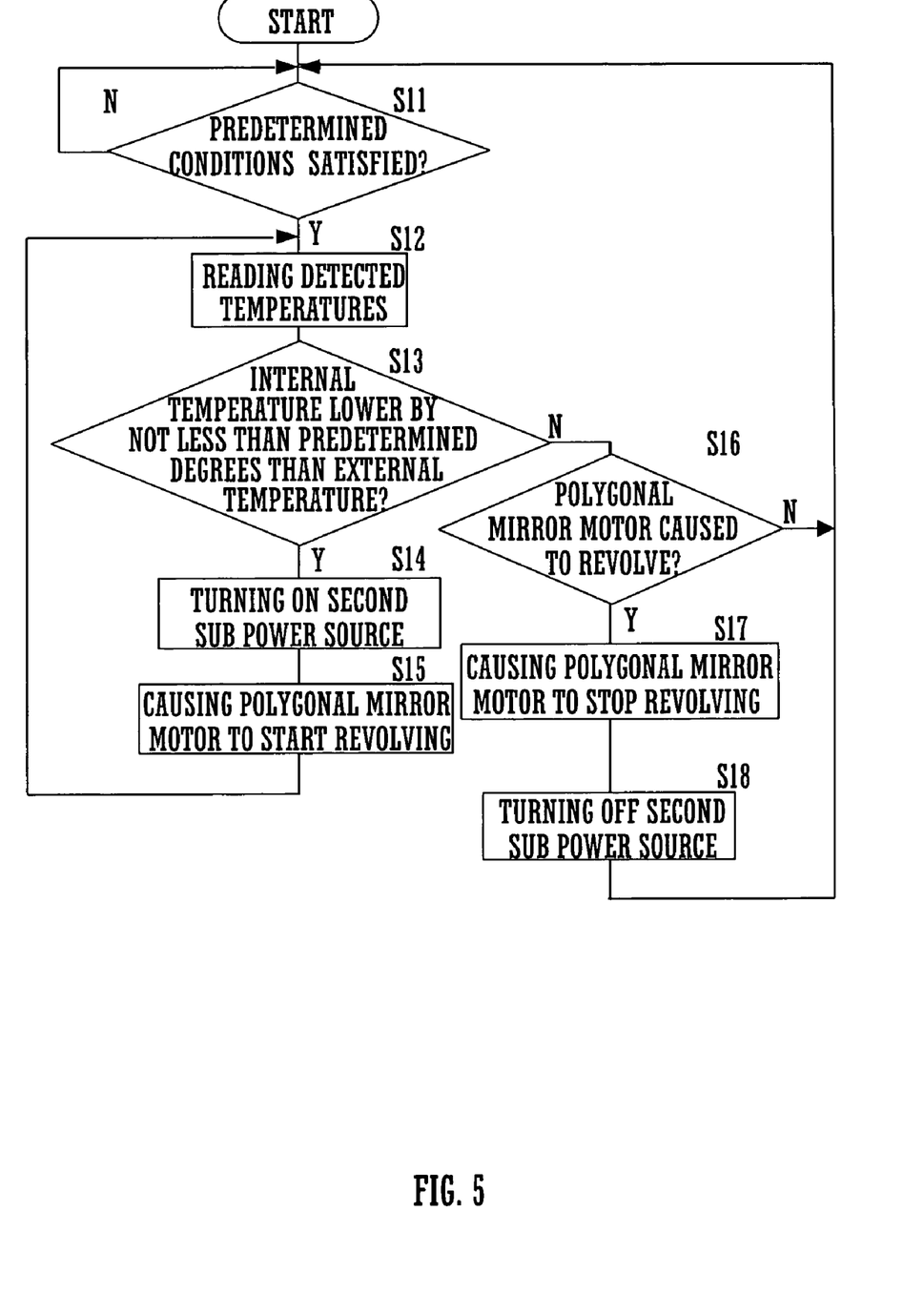
FIG. 5 is a flowchart of another processing procedure followed by the control section of the image forming apparatus.

Referring to FIG. 5, during the idle mode for receiving entry of image data from only external devices in a situation where the image forming process is not carried out by the operator, for example, at nighttime or on a holiday (step S11), the control section 228 reads temperatures detected by respective of the internal temperature sensor 21 and the external temperature sensor 22 at a predetermined timing as internal and external conditions (step S12). Then, the control section 228 calculates the temperature difference between the detected internal temperature and the detected external temperature to determine whether or not the internal temperature is lower by not less than predetermined degrees than the external temperature (step S13).

If the internal temperature is determined as being lower by the predetermined degrees than the external temperature and, hence, condensation on the surface of each optical component within the laser writing unit 227 is highly likely, the control section 228 turns on the second sub power source 33 and then actuates the polygonal mirror motor 11 to rotate the polygonal mirror 4 (steps S14 and S15). As the polygonal mirror motor 11 operates, conduction and transfer of heat generated from the polygonal mirror motor 11 and stir of air within the housing 12 occur to warm the laser writing unit 227 wholly. Thus, the surface temperature of each optical component rises at an early stage to prevent the occurrence of condensation on the surface of each optical component. Further, since the polygonal mirror motor 11 is driven by power supplied from the dedicated second power source 33, there is no need to use the high-voltage main power source 31 and, hence, the power consumption can be reduced.

The control section 228 repeats reading of detected temperatures even after actuation of the polygonal mirror motor 11 (step S15→step S12). When the internal temperature becomes sufficiently close to the external temperature, the control section 228 causes the polygonal mirror motor 11 to stop revolving, turns off the second sub power source 33 and then reassumes the idle state (step S13→step S16→step S17→step S18→step S11). If the internal temperature is determined as being sufficiently close to or higher than the external temperature in step S13, the control section 228 reassumes the idle-mode state without turning on/off the second sub power source 33 and causing the polygonal mirror motor 11 to revolve for preventing condensation (step S13→step S16→step S11).

Figure 6:
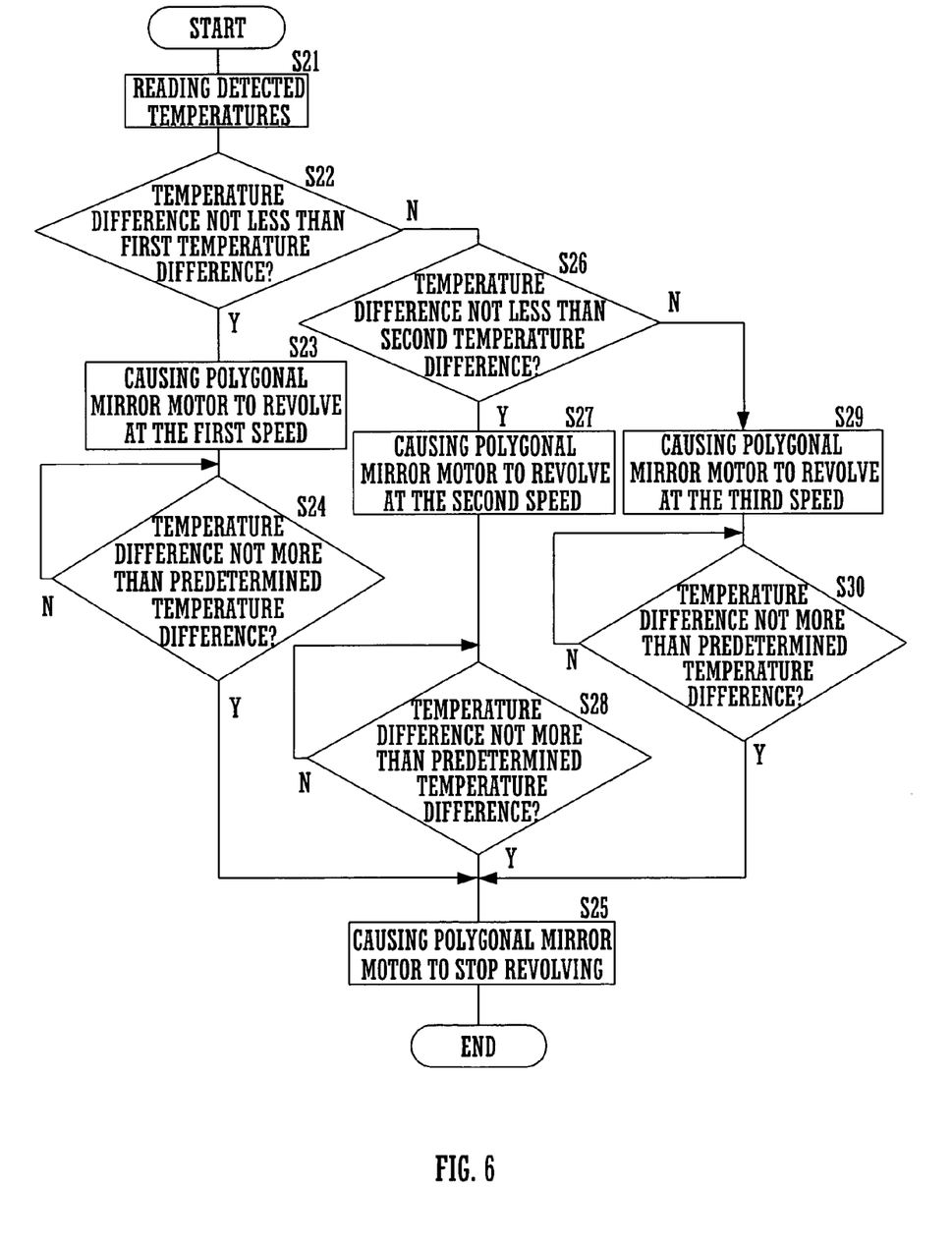
FIG. 6 is a flowchart of yet another processing procedure followed by the control section.

In another processing procedure shown in FIG. 6, the control section 228 reads temperatures detected by respective of the internal temperature sensor 21 and the external temperature sensor 22 (step S21). In cases where the detected internal temperature is lower than the detected external temperature while at the same time the detected temperature difference therebetween is larger than a predetermined temperature difference which is likely to cause condensation on the surface of each optical component to occur, the control section 228 causes the polygonal mirror motor 11 to revolve at a first speed if the detected temperature difference is not less than a first temperature difference (steps S22 and S23). If the detected temperature difference is not less than a second temperature difference, the control section 228 causes the polygonal mirror motor 11 to revolve at a second speed (steps S26 and S27). If the detected temperature difference is less than the second temperature difference, the control section 228 causes the polygonal mirror motor 11 to revolve at a third speed (step S26→step S28).

In each of the above-described cases, when the temperature difference between the internal temperature and the external temperature becomes not more than a predetermined temperature difference, the control section 228 causes the polygonal mirror motor 11 to stop revolving (step S24→step S25, step S28→step S25, or step S30→step S25). The above-described steps S21 to S30 may replace the steps S3 to S7 of the processing procedure shown in FIG. 4.

In an exemplary setting, the first and second temperature differences are set to 20° C. and 10° C., respectively, while the predetermined temperature difference set to 5° C.; and the first, second and third speeds are set to about 40,000 rpm, about 30,000 rpm and about 10,000 rpm, respectively. The first speed corresponds to a first processing speed at which the image forming apparatus 1 performs image formation on about 70 sheets per minute, while the second speed corresponds to a second processing speed at which the image forming apparatus 1 performs image formation on about 50 sheets per minute. The third speed corresponds to a speed not higher than a normal processing speed of the image forming apparatus 1.

Thus, the polygonal mirror motor 11 is caused to revolve at a speed corresponding to the temperature difference between an internal temperature and an external temperature. When such a temperature difference is relatively large, the polygonal mirror motor 11 is caused to revolve at a high speed in order to generate a larger amount of heat. Accordingly, the internal temperature of the laser writing unit 227 is brought close to the external temperature rapidly, whereby the occurrence of condensation on the surface of each optical component can be prevented assuredly. Further, by making at least one of different revolving speeds of the polygonal mirror motor 11 correspond to a processing speed of the image forming apparatus 1, the revolving speed control over the polygonal mirror motor 11 during the condensation preventing process can be simplified.

Any one of the different revolving speeds of the polygonal mirror motor 11 may be established so as to differ from the processing speed of the image forming apparatus 1, though it becomes impossible to simplify the revolving speed control over the polygonal mirror motor 11 during the condensation preventing process.

In the case where the laser writing unit 227 is adaptable to different types of image forming apparatus, the polygonal mirror motor 11 is configured to be capable of revolving at speeds corresponding to the processing speeds of all these types of image forming apparatus. Thus, in an image forming apparatus of which processing speed is relatively low, the polygonal mirror motor 11 can revolve at a speed not lower than the speed corresponding to the processing speed for image formation.

Such a configuration is possible that during the condensation preventing process in which the polygonal mirror motor 11 is driven, the semiconductor laser 2 is driven within a range which fails to allow laser light to become incident on the periphery of the photosensitive drum 222 so that heat generated by the semiconductor laser 2 is utilized in raising the internal temperature of the laser writing unit 227. In this case the operation of the semiconductor laser 2 is stopped during a period from the time when the BD sensor 10 receives laser light in normal image formation processing to a predetermined time when laser light modulated in accordance with one line of image data is to be emitted, while the semiconductor laser 2 is driven during other period. With this configuration the photosensitive drum 222 can be prevented from fatigue due to irradiation with rays of laser light that fail to contribute to image formation.

If a request for image formation is made by an operation on keys of the operating section 27 during the above-described condensation preventing process, image formation processing is forbidden. This is to prevent image formation of degraded quality due to condensation on the surface of each optical component. In this case, if the revolving speed of the polygonal mirror motor 11 is varied so as to correspond to the image formation processing speed without stopping the revolution of the polygonal mirror motor 11 after completion of the condensation preventing process, the image forming process can be started quickly. Further, the initializing operation of the image forming apparatus 1 (including, for example, forwardly rotating the rotary members of the image forming section 210, image adjustment, and warm-up of the fixing unit 217) may be performed in parallel with the condensation preventing process proceeding.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

What is claimed is:

1. A light beam scanning unit comprising: a light source configured to emit a light beam; a deflecting member configured to deflect the light beam in a predetermined scanning direction by rotation caused by a driving force of a motor; optical components including a lens configured to focus the light beam on an object to form an image on the object; a housing accommodating the light source, the deflecting member and the optical components therein; a detector configured to detect a temperature inside the housing and a temperature outside the housing; and a driving control circuit configured to carry out a condensation preventing process by causing the deflecting member to rotate when detection is made of a condition where the temperature outside the housing is higher than the temperature inside the housing.

2. The light beam scanning unit according to claim 1, wherein the driving control circuit is operative to rotate the deflecting member at a speed corresponding to a temperature difference between the temperature outside the housing and the temperature inside the housing which are detected by the detector during the condensation preventing process.

3. The light beam scanning unit according to claim 1, wherein the driving control circuit is operative to drive the light source within a range which fails to allow the light beam to become incident on the object.

4. The light beam scanning unit according to claim 2, wherein the driving control circuit is operative to drive the light source within a range which fails to allow the light beam to become incident on the object.

5. An image forming apparatus comprising a light beam scanning unit,
the light beam scanning unit comprising: a light source configured to emit a light beam; a deflecting member configured to deflect the light beam in a predetermined scanning direction by rotation caused by a driving force of a motor; optical components including a lens configured to focus the light beam on an image carrier to form an image on the image carrier; a housing accommodating the light source, the deflecting member and the optical components therein; a detector configured to detect a temperature inside the housing and a temperature outside the housing; and a driving control circuit configured to carry out a condensation preventing process by causing the deflecting member to rotate when detection is made of a condition where the temperature outside the housing is higher than the temperature inside the housing, wherein
during an image forming process in which the detector fails to detect the condition where the temperature outside the housing is higher than the temperature inside the housing, an electrostatic latent image formed on the image carrier by scanning with the light beam emitted from the light source and modulated in accordance with image data is turned into a visible image, which in turn is transferred to a recording medium.

6. The image forming apparatus according to claim 5, wherein the detector is operative to detect a temperature at a location adjacent the light beam scanning unit as the temperature inside the housing and a temperature outside an apparatus body as the temperature outside the housing.

7. The image forming apparatus according to claim 5, wherein the driving control circuit is operative to revolve the motor configured to drive the deflecting member at any one of different revolving speeds including a revolving speed corresponding to a processing speed of the image forming process selectively.

8. The image forming apparatus according to claim 5, wherein: the driving control circuit is connected to a main power source configured to supply electric power to an apparatus body during the image forming process and to a power source which is different from the main power source; and the driving control circuit is operative to cause the power source different from the main power source to supply electric power to the motor when the detector detects the condition where the temperature outside the housing is higher than the temperature inside the housing.

9. The image forming apparatus according to claim 5, wherein: the driving control circuit is connected to a main power source configured to supply electric power to an apparatus body during the image forming process and to first and second sub power sources which are different from the main power source; and the driving control circuit is operative to cause the first sub power source to supply electric power to the apparatus body during standby for the image forming process and cause the second sub power source to supply electric power to the motor when the detector detects the condition where the temperature outside the housing is higher than the temperature inside the housing.

10. The image forming apparatus according to claim 5, wherein the image forming process is forbidden to proceed when a request for image formation is made during the condensation preventing process carried out by the driving control circuit.

11. The image forming apparatus according to claim 7, wherein a revolving speed of the motor is varied to the speed corresponding to the processing speed of the image forming process after completion of the condensation preventing process when a request for image formation is made during the condensation preventing process carried out by the driving control circuit.

* * * * *